(12) United States Patent
Elangovan et al.

(10) Patent No.: US 8,319,888 B2
(45) Date of Patent: Nov. 27, 2012

(54) METHOD OF DETERMINING FIELD DOMINANCE IN A SEQUENCE OF VIDEO FRAMES

(75) Inventors: Premkumar Elangovan, Tamil Nadu (IN); Oliver Barton, Bristol (GB)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 12/420,737

(22) Filed: Apr. 8, 2009

(65) Prior Publication Data
US 2012/0162504 A1 Jun. 28, 2012

(30) Foreign Application Priority Data
Apr. 11, 2008 (EP) .................................. 08251411

(51) Int. Cl.
*H04N 7/01* (2006.01)
*H04N 5/21* (2006.01)

(52) U.S. Cl. ........ 348/441; 348/448; 348/458; 348/616; 348/619

(58) Field of Classification Search .................. 348/441, 348/458, 459, 446, 448, 618–620, 616; *H04N 7/01, H04N 5/21*
See application file for complete search history.

(56) References Cited

U.S. PATENT DOCUMENTS

| | | | |
|---|---|---|---|
| 4,816,915 A | 3/1989 | Imai et al. | |
| 6,983,013 B1 | 1/2006 | Gautier et al. | |
| 7,233,363 B2 * | 6/2007 | Song | 348/448 |
| 2006/0007352 A1 | 1/2006 | Liao et al. | |
| 2006/0139491 A1 | 6/2006 | Baylon et al. | |
| 2011/0157371 A1 * | 6/2011 | Elangovan et al. | 348/180 |

FOREIGN PATENT DOCUMENTS

| | | |
|---|---|---|
| JP | 2007 081500 | 3/2007 |
| WO | WO 01/10133 | 2/2001 |

* cited by examiner

*Primary Examiner* — Sherrie Hsia
(74) *Attorney, Agent, or Firm* — Matthew D. Rabdau; Michael A. Nelson

(57) ABSTRACT

A method of determining field dominance in a sequence of video frames, the method comprising: generating from a first video frame a top field and a bottom field; interpolating the top and bottom fields to produce an interpolated top field frame and an interpolated bottom field frame respectively; correlating each of the interpolated top field frame and interpolated bottom field frame with a second video frame occurring immediately previous to the first video frame in the sequence of video frames and with a third video frame occurring immediately subsequent to the first video frame in the sequence of video frames; and determining from the outcome of the correlation the field dominance of the sequence of video frames.

20 Claims, 7 Drawing Sheets

600 step 515
↓ calculating a first difference value between correlation outcomes of the correlation of the interpolated top field frame to the previous frame and the correlation of the interpolated top field frame to the subsequent frame — 605

↓ calculating a second difference value between the correlation outcomes of the correlation of the interpolated bottom field frame to the previous frame and the correlation of the interpolated bottom field frame to the subsequent frame — 610

↓ determining the field dominance only if the first and second difference values are greater than a predetermined threshold value — 615

FIG. 6

700 step 515

counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame ~705

FIG. 7

METHOD OF DETERMINING FIELD DOMINANCE IN A SEQUENCE OF VIDEO FRAMES

FIELD OF THE INVENTION

The present invention relates to a method of determining field dominance in a sequence of video frames.

BACKGROUND

Video frames can be classified as either progressive or interlaced, depending upon the method used to display them. In a progressive frame the horizontal lines of pixels that make up the frame are displayed line by line from top to bottom. In contrast, an interlaced frame is created by displaying two fields in turn, one field (known as the top field) containing the top line of the frame and every second subsequent line, and the other field (the bottom field) containing the second line from the top and every subsequent second line, thus including the bottom line of the frame. Interlaced frames rely on the fact that it takes time for the first field of displayed pixels to decay from the display apparatus, during which time the second field is displayed, so as to create the illusion of a single frame containing all the lines of pixels.

The fields of an interlaced video frame are captured sequentially, which means that there is a small time delay between the first field to be captured and the second field to be captured. It is possible for the information contained in the scene to change in this time interval and for this reason it is desirable that the fields of the video frame are displayed in the correct order.

Interlaced video frames can be described as either "top field first" or "bottom field first", depending upon which of the fields making up the frame is intended to be displayed first. As there is small delay between displaying the first field and displaying the second field, the field intended to be displayed second may contain different information from that contained in the field intended to be displayed first, for example if movement has occurred in the frame in the delay between displaying the first and second fields. Such differences between the field intended to be displayed first and the field intended to be displayed second are known as "inter-field motion". If fields containing inter-field motion are displayed in an incorrect order, distortion may appear in the displayed frame. In an interlaced display, for example, the video typically becomes juddery or shaky as information appears earlier than it was intended to appear. In a progressive display, the reversal of the fields will not cause such juddery or shaky video, as the fields are put together and displayed at a rate of N frames per second, rather than 2N fields per second, but regardless of the field order, the inter-field motion will lead to combing artifacts, i.e. areas of the frames where rows of lines appear, giving a "combed" appearance.

The property of a sequence of video frames by which the sequence can be described as either "top field first" or "bottom field first" is referred to as the field dominance (or field polarity) and is generally dictated by the video standards under which the video sequence is either recorded or intended to be displayed. For example, the most popular European broadcast standard is PAL (phase alternating line) and has top field first field dominance, whereas the American broadcast standard is NTSC (national television systems committee) which has bottom field first field dominance. If a video sequence having a particular field dominance is played back through a video system configured to play video sequences of the opposite field dominance, or in other words if the field order is reversed, severe visual artifacts may be produced, for example any motion in the video sequence may have a juddering and jittery appearance. Such artifacts will only occur when the video sequence is displayed on an interlaced display but will not be visible when viewed on a progressive display, as in such a display successive fields are combined together to form a frame for displaying. Although ideally metadata associated with the video stream, which may take the form of a flag encoded in the video stream, will indicate whether a particular video sequence should be top field first or bottom field first, it is possible that either the metadata is not set correctly, possibly as a result of an editing process, or the intended playback equipment, for example video decoder within a digital set top box, is not configured so as to be able to either read the metadata or take the metadata into consideration. It would therefore be beneficial to video producers and broadcasters to be able to quickly and easily determine the field dominance in a video sequence.

SUMMARY

According to a first embodiment of the present invention there is provided a method of determining field dominance in a sequence of video frames, the method comprising: generating from a first video frame, a top field and a bottom field; interpolating the top and bottom fields to produce an interpolated top field frame and an interpolated bottom field frame respectively; correlating each of the interpolated top field frame and interpolated bottom field frame with a second video frame occurring immediately previous to the first video frame in the sequence of video frames and with a third video frame occurring immediately subsequent to the first video frame in the sequence of video frames; applying a metric to the outcome of the correlation; and determining from the applied metric the field dominance of the sequence of video frames.

The interpolated top field frame may be produced by averaging adjacent lines of the top field and the interpolated bottom field frame may be produced by averaging adjacent lines of the bottom field.

When the correlation to the interpolated top field frame is greater with the previous frame than with the subsequent frame and the correlation to the interpolated bottom field frame is greater with the subsequent frame than the previous frame, then the field dominance is preferably determined to be top field first.

Similarly, when the correlation to the interpolated top field frame is greater with the subsequent frame than with the previous frame and the correlation to the interpolated bottom field is greater with previous frame than with the subsequent frame, then the field dominance is preferably determined to be bottom field first.

Prior to performing the determination step the method may further comprise: calculating a first difference value between correlation outcomes of the correlation at the interpolated top field frame to the previous frame and the correlation of the interpolated top field frame to the subsequent frame; calculating a second difference value between the correlation outcomes of the correlation of the interpolated bottom field frame to the previous frame and the correlation of the interpolated bottom field frame to the subsequent frame; and determining the field dominance only if the first and second difference values are greater than a predetermined threshold value.

Additionally, in one embodiment of the present invention, the threshold value is determined by calculating the first and second difference values for a known sequence of static frames.

The method may further comprise, subsequent to the correlation step, counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

According to a further aspect of the present invention there is also provided a computer program for performing the method of the first aspect of the invention.

Embodiments of the present invention will now be described below by way of non-limiting illustrative example only, with reference to the accompanying figures, of which:

BRIEF DESCRIPTION OF THE DRAWINGS

FIG. 6 depicts a method of determining field dominance in a sequence of video frames according to a second embodiment of the present invention.

FIG. 7 depicts a method of determining field dominance in a sequence of video frames according to a third embodiment of the present invention.

DETAILED DESCRIPTION

Figure 1:
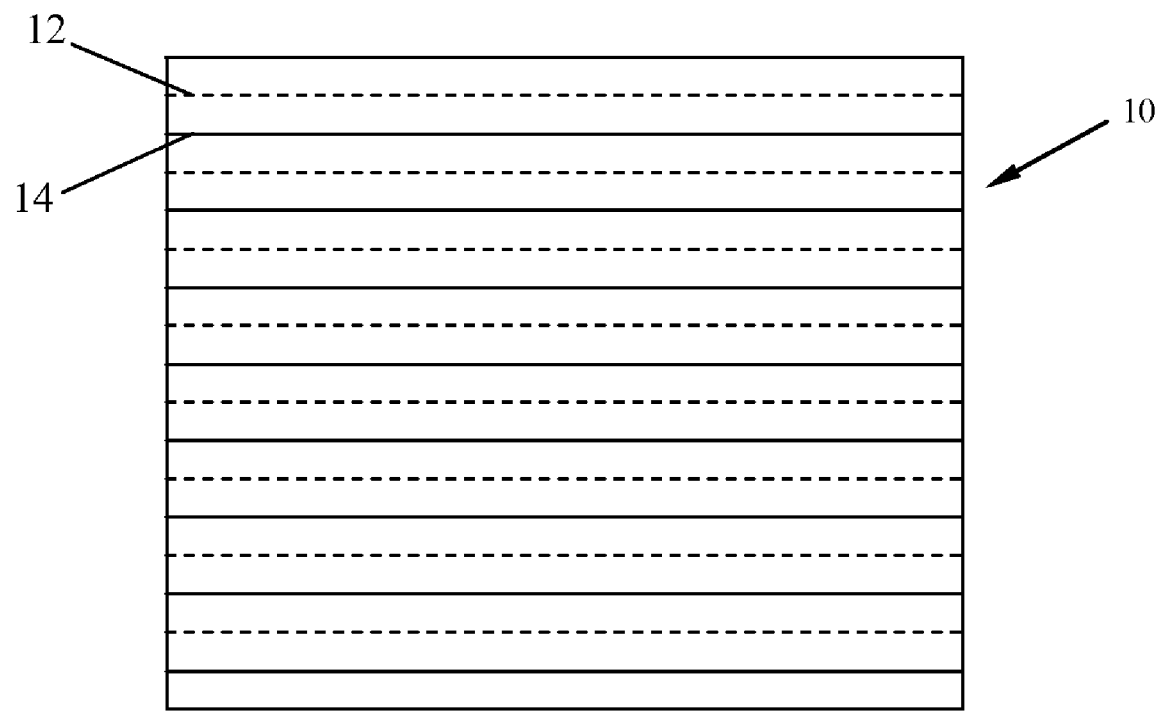
FIG. 1 schematically illustrates an interlaced video frame.

Referring to FIG. 1, a video frame 10 is schematically illustrated that comprises horizontal lines 12, 14 that make up an image. Typically, a frame conforming to the PAL standard comprises 625 such lines of pixels, whilst a frame conforming to the US NTSC standard comprises 525 lines. As previously mentioned, each video frame 10 comprises two separate fields. One field will contain the top line of pixels and every subsequent second line, i.e. it will contain all of the broken lines illustrated in the representation of FIG. 1. This field is referred to as the top field. The other field will contain the second line of pixels and every subsequent second line, such that it includes the bottom line of pixels in the video frame, i.e. the solid line of pixels represented in FIG. 1. This field is referred to as the bottom field.

Although individual video sequences will be recorded with a constant, single, field dominance, it is quite likely that a number of such individual video sequences will be edited together to form the final broadcast video and it is probable that different individual video sequences will have different field dominance, since the individual video sequences may be captured and collated using the differing broadcast standards available and applicable. As previously noted, if a sequence of video frames is displayed with the field order reversed then severe visual artifacts will tend to be produced when the edited sequence is viewed on an interlaced display. It is therefore extremely useful and desirable when editing a number of video sequences to be aware of the field dominance of each video sequence to ensure that field dominance is preserved in the final edited video sequence.

Figure 2:
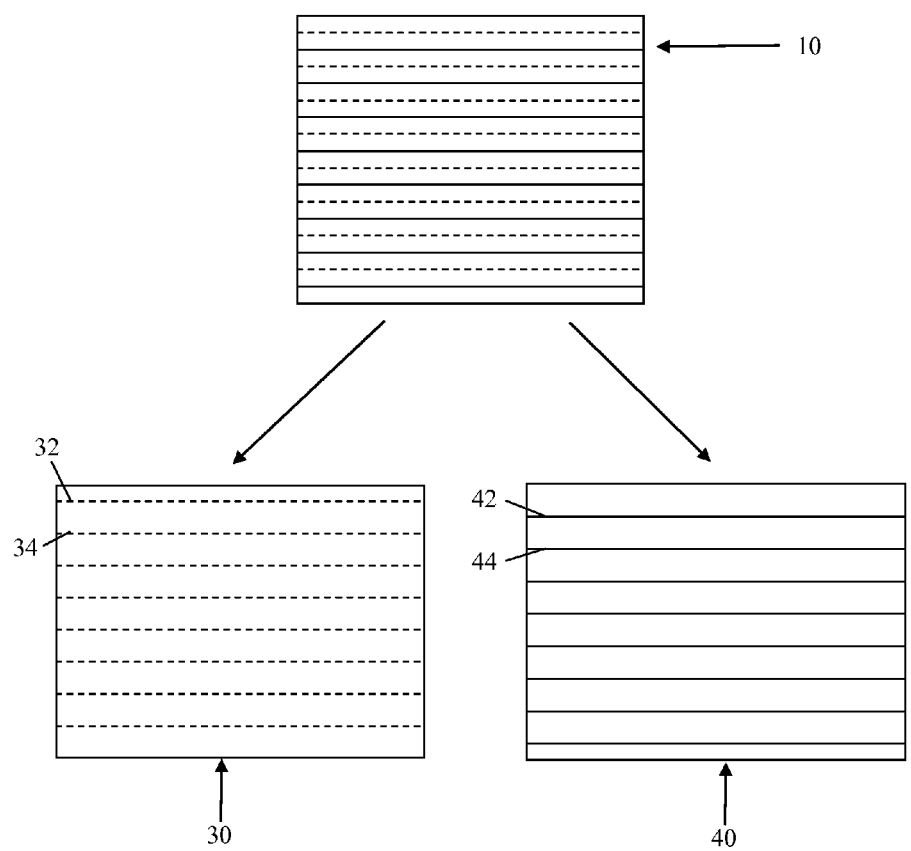
FIG. 2 schematically illustrates generating a pair of video fields from an interlaced video frame.

To determine the field dominance according to embodiments of the present invention an individual video frame 10 must be divided into top and bottom fields. Referring to FIG. 2, the top field 30 is generated by extracting the top line 12 of pixels from the frame 10 and every second subsequent line of pixels and storing these lines in the position from which they were extracted in the frame 10 in the top field 30. Similarly, the bottom field 40 is generated by extracting the second line 14 of pixels and every subsequent second line of pixels and storing them in the position from which they were extracted from the frame 10 in the bottom field 30.

The top and bottom fields 30, 40 each contain only half of the information contained in the video frame 10 from which they were generated. Therefore, the top and bottom fields must be interpolated to produce top and bottom field frames each containing as much information as the video frame 10. Any interpolation method may be used in embodiments of the present invention, however in the embodiment illustrated in FIG. 2 adjacent lines of pixels in the field to be interpolated are averaged. Thus, for example, to generate the second line of an interpolated top field frame, as illustrated at 50 in FIG. 3, the value of each pixel of the top line 32 of the top field 30 is summed with the value of the corresponding pixel of the second line 34 of the top field 30 and divided by 2 to obtain an average pixel value and the "missing" second line of the top field 30 is built up from the average pixel values calculated in this way.

Figure 3:
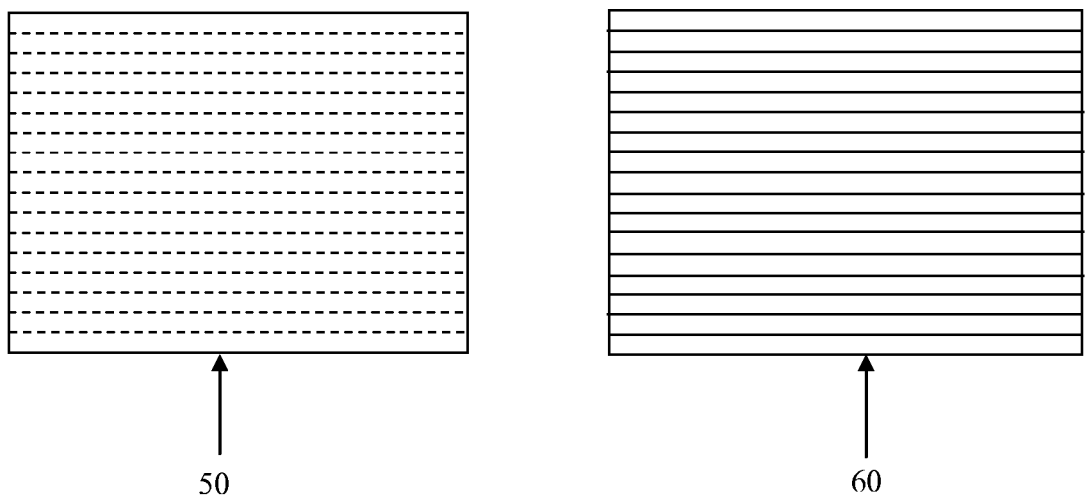
FIG. 3 schematically illustrates a pair of interpolated top and bottom field frames.

Similarly, to generate the second line of an interpolated bottom field frame, shown as 60 in FIG. 3, the value of each pixel of the first line 42 of the bottom field 40 is summed with the value of the corresponding pixel of the second line 44 of the bottom field 40 and resulting sum of pixel values is divided by 2 to obtain an average pixel value and the "missing" second line of the bottom field 40 is built up from the average pixel values calculated in this way. This process is repeated to generate, from the top and bottom fields 30, 40, interpolated top and bottom field frames 50, 60, each of which contains as much information as the frame 10 from which the top and bottom fields 30, 40 were generated. The interpolated top and bottom field frames 50, 60 are effectively progressive frames which represent the information that can be seen at the time at which each of the top and bottom fields 30, 40 are displayed in an interlaced system.

Figure 4:
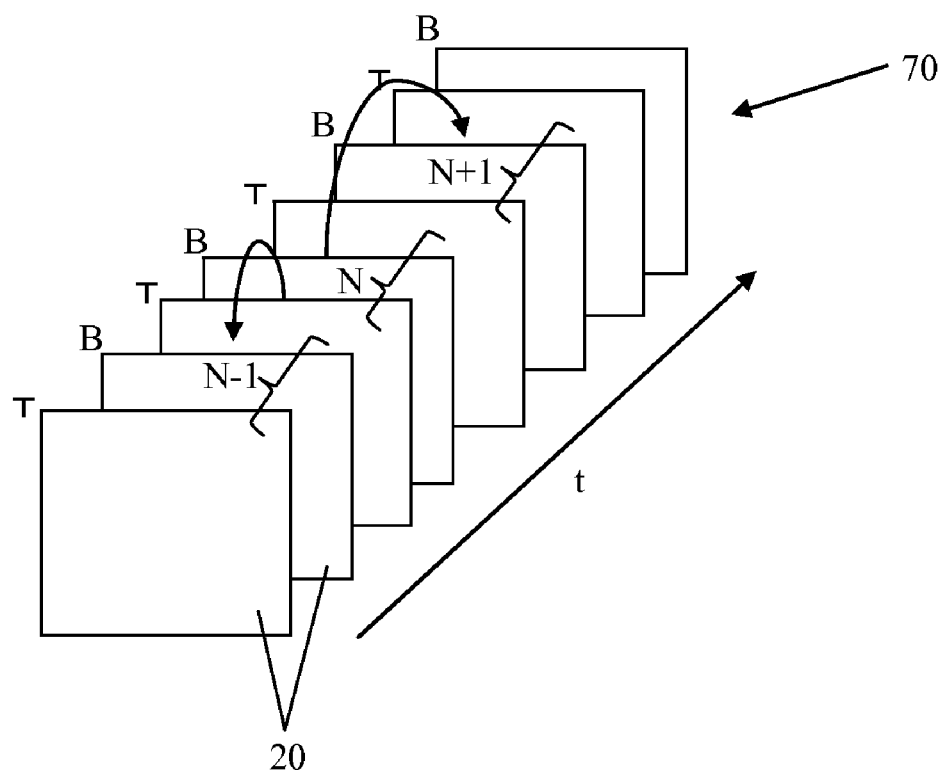
FIG. 4 schematically illustrates the principle of temporal correlation between individual fields of a frame and previous or subsequent frames.

The interpolated top and bottom field frames 50, 60 are then each correlated with the previous frame in the video sequence to the frame from which the interpolated field frames have been generated and also correlated with the next frame in the video sequence. The rationale for performing this correlation process is derived from the knowledge that the time difference between two frames in a video sequence is inversely proportional to the correlation between them. This principle can also be applied to the separate fields that constitute each frame. The field to be displayed first in a particular frame will have a closer relation to the preceding frame in the video sequence, whilst the field to be displayed second will have a closer correlation to the succeeding frame. A diagrammatic representation of this principle is shown in FIG. 4 in which a sequence of video frames 70 is illustrated, with each frame comprising a top and bottom field 20. In the sequence illustrated in FIG. 4 the field dominance is top field first. It can be seen that the top field of the Nth frame (and therefore the interpolated top field frame derived from it) has a closer temporal and spatial correlation with the preceding, N−1, frame, whilst the bottom field of the Nth frame has a closer temporal and spatial correlation with the succeeding, N+1, frame.

As previously mentioned, both the interpolated top field frame ($X_T$) and the interpolated bottom field frame ($X_B$) are correlated with the previous frame ($X_p$) and the next future frame ($X_f$) such that for each frame in the video sequence four separate correlation values are obtained:

$a$=correlation ($X_T, X_p$)

$b$=correlation ($X_B, X_f$)

$c$=correlation ($X_T, X_f$)

$d$=correlation ($X_B, X_p$)

Any suitable metric may be used to measure the correlation, such as peak signal to noise ratio (PSNR), mean square error (MSE) or mean absolute error (MAE).

In some embodiments a correlation difference factor, Δ, is calculated and a check using a correlation difference factor Δ is performed as follows:

Δ=$Abs$ ($a−c$)

Δ=$Abs$ ($b−d$)

Δ>threshold

The correlation difference factor Δ indicates the degree of similarity between the frames for which the correlation has to be calculated. A high value of the correlation difference factor indicates that there is low similarity between the frames and therefore there is more active motion information available for processing, thereby improving the reliability of the method. A low value of the correlation difference factor Δ indicates that the frames are similar and may consequently lead to false positives, as there is no significant activity happening between the frames. Consequently, the threshold for the correlation difference factor Δ is preferably determined from the correlation difference factor outcomes for known static frames. If this correlation difference factor is less than the predetermined threshold, then the field order of the frame is considered indeterminate. If the correlation difference factor is greater than the threshold then the following table shows the possible results of the correlation check and their interpretation.

| Number | Condition | Interpretation |
|---|---|---|
| 1 | a > c and b > d | Field order = top field first |
| 2 | a < c and b < d | Field order = bottom field first |
| 3 | other conditions | Indeterminate result |

Referring to this table it can be seen that for condition 3 the result achieved is indeterminate, i.e. is not possible to infer from the correlation result what the field dominance is and there is an equal probability of both bottom and top fields being displayed first in order. This indeterminate condition typically happens when one of the neighboring frames is static or conversely when there is a significant texture change among the frames. In further embodiments of the present invention further processing of the frames is performed to try and resolve those indeterminate results from the frame correlation process. In further embodiments of the present invention the further processing technique applied comprises determining the level of correlation in luminance value pixel by pixel between each of the interpolated field frames and the previous and future frame within the video sequence. This metric determines pixel by pixel if the pixel value of the interpolated field frame is closer to the value of a corresponding pixel in a first reference frame than to the value of the corresponding pixel in a second reference frame. Depending upon the outcome a counter is either incremented or decremented and the final counter value represents the outcome of the correlation calculation. For each field frame two correlation calculations are performed, a first calculation in which the first reference frame is the previous frame in the video sequence and the second reference frame is the future frame, and a second calculation in which the first reference frame is the future frame and the second reference frame is the previous frame. The four possible correlation calculations for each pair of interpolated frames are indicated below, in which the correlation metric is referred to as the optical flow.

$Oa$=optical flow ($X_T, X_p, X_f$)

$Ob$=optical flow ($X_T, X_f, X_p$)

$Oc$=optical flow ($X_B, X_p, X_f$)

$Od$=optical flow ($X_B, X_f, X_p$)

The optical flow metric effectively looks at the direction of movement (or optical flow) between successive frames, rather than simply the magnitude of change in pixel luminance value. This reduces the possible masking effect of a large change in luminance value occurring over only a small area of an image frame, which would tend to generate a false positive in the initial correlation calculation as described above. The outcome of the four optical flow correlation determinations is subsequently interpreted as follows:

| Number | Condition | Interpretation |
|---|---|---|
| 1 | oa > ob and oc < od | Top field first |
| 2 | oa < ob and oc > od | Bottom field first |
| 3 | other conditions | Inconclusive result |

As can be seen from the condition table above, it is still possible after the further processing that the result of the field order determination is inconclusive, in which case the result for that frame is either disregarded or is recorded as inconclusive.

Nonetheless, the above described method for detecting field dominance according to the present invention provides a robust output across video data streams of different bit rate, resolution and quality. A particular advantage of the method of the present invention is that it does not generate false positives for a progressive frame, since the field dominance has no influence on such frames such that the method of the present invention will generate an inconclusive result for such progressive frames.

Figure 5:
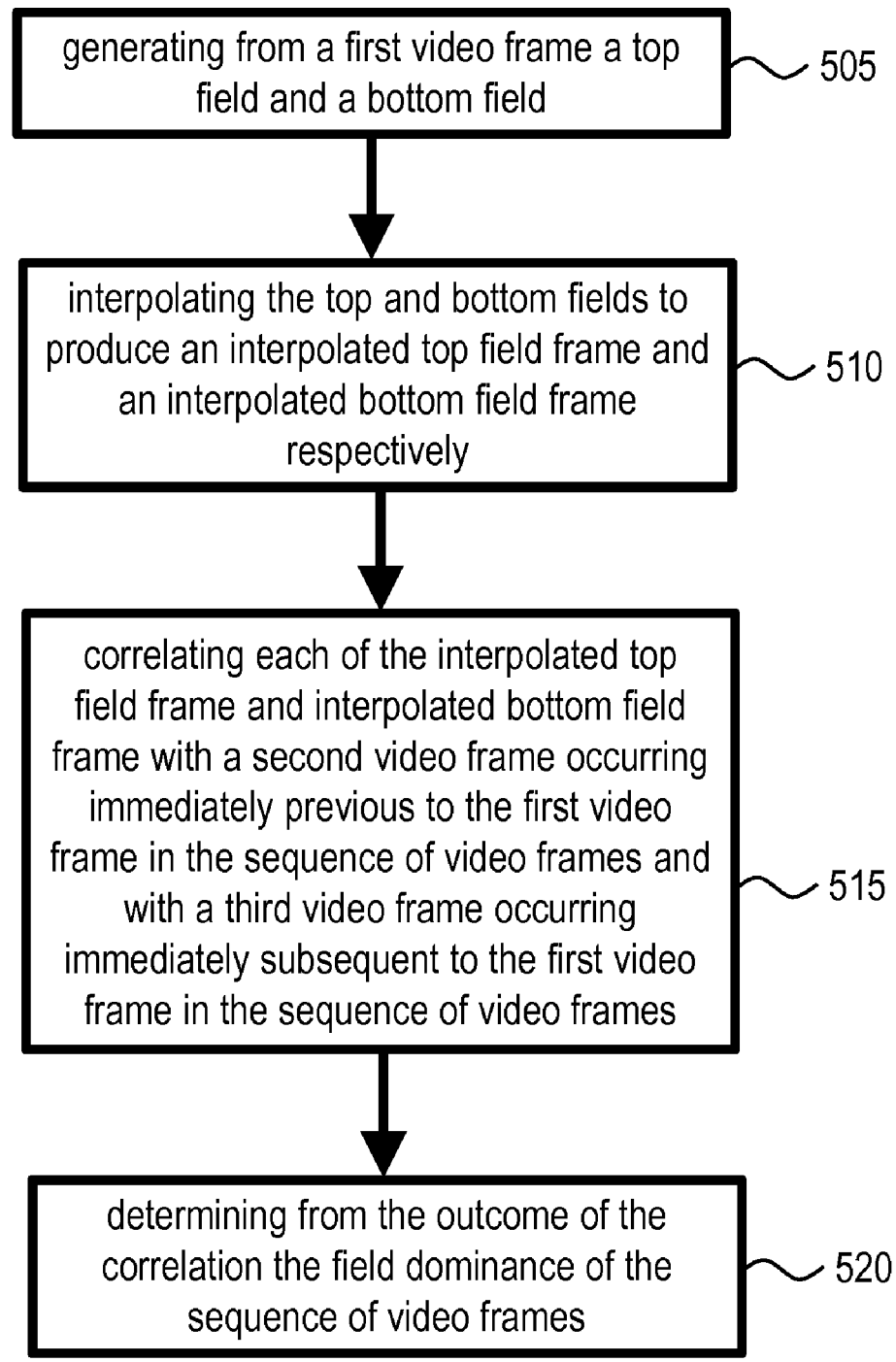
FIG. 5 depicts a method of determining field dominance in a sequence of video frames according to a first embodiment of the present invention.

FIG. 5 depicts a method 500 of determining field dominance in a sequence of video frames according to a first embodiment of the present invention. The method 500 comprises the steps of: Step 505: Generating from a first video frame a top field and a bottom field; Step 510: Interpolating the top and bottom fields to produce an interpolated top field frame and an interpolated bottom field frame respectively; Step 515: Correlating each of the interpolated top field frame and interpolated bottom field frame with a second video frame occurring immediately previous to the first video frame in the sequence of video frames and with a third video frame occurring immediately subsequent to the first video frame in the sequence of video frames; and Step 520: Determining from the outcome of the correlation the field dominance of the sequence of video frames.

FIG. 6 depicts a method 600 of determining field dominance in a sequence of video frames according to a second embodiment of the present invention. The method 600 comprises the steps of: After Step 515, Step 605: Calculating a first difference value between correlation outcomes of the correlation of the interpolated top field frame to the previous frame and the correlation of the interpolated top field frame to the subsequent frame; Step 610: Calculating a second difference value between the correlation outcomes of the correlation of the interpolated bottom field frame to the previous frame and the correlation of the interpolated bottom field frame to the subsequent frame; and Step 615: Determining the field dominance only if the first and second difference values are greater than a predetermined threshold value.

FIG. 7 depicts a method 700 of determining field dominance in a sequence of video frames according to a third embodiment of the present invention. The method 700 comprises the steps of: After Step 515, Step 705: Counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

What is claimed is:

1. A method of determining field dominance in a sequence of video frames, the method comprising:
    generating from a first video frame a top field and a bottom field;
    interpolating the top and bottom fields to produce an interpolated top field frame and an interpolated bottom field frame respectively;
    correlating each of the interpolated top field frame and interpolated bottom field frame with a second video frame occurring immediately previous to the first video frame in the sequence of video frames and with a third video frame occurring immediately subsequent to the first video frame in the sequence of video frames; and
    determining from the outcome of the correlation the field dominance of the sequence of video frames.

2. The method of claim 1 wherein the interpolated top field frame is produced by averaging adjacent lines of the top field and the interpolated bottom field frame is produced by averaging adjacent lines of the bottom field.

3. The method of claim 2, wherein when the correlation to the interpolated top field frame is greater with the subsequent frame than with the previous frame and the correlation to the interpolated bottom field is greater with previous frame than with the subsequent frame, then the field dominance is determined to be bottom field first.

4. The method of claim 2, wherein prior to performing the determination step the method further comprises:
    calculating a first difference value between correlation outcomes of the correlation of the interpolated top field frame to the previous frame and the correlation of the interpolated top field frame to the subsequent frame;
    calculating a second difference value between the correlation outcomes of the correlation of the interpolated bottom field frame to the previous frame and the correlation of the interpolated bottom field frame to the subsequent frame; and
    determining the field dominance only if the first and second difference values are greater than a predetermined threshold value.

5. The method of claim 2, further comprising, subsequent to the correlation step, counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

6. The method of claim 1, wherein when the correlation to the interpolated top field frame is greater with the previous frame than with the subsequent frame and the correlation to the interpolated bottom field frame is greater with the subsequent frame than the previous frame, then the field dominance is determined to be top field first.

7. The method of claim 6, wherein when the correlation to the interpolated top field frame is greater with the subsequent frame than with the previous frame and the correlation to the interpolated bottom field is greater with previous frame than with the subsequent frame, then the field dominance is determined to be bottom field first.

8. The method of claim 1, wherein when the correlation to the interpolated top field frame is greater with the previous frame than with the subsequent frame and the correlation to the interpolated bottom field frame is greater with the subsequent frame than the previous frame, then the field dominance is determined to be top field first.

9. The method of claim 8, wherein when the correlation to the interpolated top field frame is greater with the subsequent frame than with the previous frame and the correlation to the interpolated bottom field is greater with previous frame than with the subsequent frame, then the field dominance is determined to be bottom field first.

10. The method of claim 9, wherein prior to performing the determination step the method further comprises:
    calculating a first difference value between correlation outcomes of the correlation of the interpolated top field frame to the previous frame and the correlation of the interpolated top field frame to the subsequent frame;
    calculating a second difference value between the correlation outcomes of the correlation of the interpolated bottom field frame to the previous frame and the correlation of the interpolated bottom field frame to the subsequent frame; and
    determining the field dominance only if the first and second difference values are greater than a predetermined threshold value.

11. The method of claim 10, wherein the threshold value is determined by calculating the first and second difference values for a known sequence of static frames.

12. The method of claim 11 further comprising, subsequent to the correlation step, counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

13. The method of claim 9, further comprising, subsequent to the correlation step, counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

14. The method of claim 8, wherein prior to performing the determination step the method further comprises:
   calculating a first difference value between correlation outcomes of the correlation of the interpolated top field frame to the previous frame and the correlation of the interpolated top field frame to the subsequent frame;
   calculating a second difference value between the correlation outcomes of the correlation of the interpolated bottom field frame to the previous frame and the correlation of the interpolated bottom field frame to the subsequent frame; and
   determining the field dominance only if the first and second difference values are greater than a predetermined threshold value.

15. The method of claim 8, further comprising, subsequent to the correlation step, counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

16. The method of claim 1, wherein when the correlation to the interpolated top field frame is greater with the subsequent frame than with the previous frame and the correlation to the interpolated bottom field is greater with previous frame than with the subsequent frame, then the field dominance is determined to be bottom field first.

17. The method of claim 1, wherein prior to performing the determination step the method further comprises:
   calculating a first difference value between correlation outcomes of the correlation of the interpolated top field frame to the previous frame and the correlation of the interpolated top field frame to the subsequent frame;
   calculating a second difference value between the correlation outcomes of the correlation of the interpolated bottom field frame to the previous frame and the correlation of the interpolated bottom field frame to the subsequent frame; and
   determining the field dominance only if the first and second difference values are greater than a predetermined threshold value.

18. The method of claim 17, wherein the threshold value is determined by calculating the first and second difference values for a known sequence of static frames.

19. The method of claim 17, further comprising, subsequent to the correlation step, counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

20. The method of claim 1, further comprising, subsequent to the correlation step, counting the number of pixels for which the difference in pixel value between a pixel in each of the interpolated top field frame and interpolated bottom field frame and a corresponding pixel in a first reference frame is less than the difference in pixel value between the pixel and a corresponding pixel in a second reference frame, wherein the number of pixels is counted for each of the interpolated top and bottom field frames when the first reference frame comprises the previous frame and the second reference frame comprises the subsequent frame and when the first reference frame comprises the subsequent frame and the second reference frame comprises the previous frame.

* * * * *